(12) United States Patent
Jung

(10) Patent No.: US 7,148,468 B2
(45) Date of Patent: Dec. 12, 2006

(54) MIRROR ANGLE MEASUREMENT AND SERVO CONTROL APPARATUS FOR HOLOGRAPHIC DIGITAL DATA STORAGE SYSTEM

(75) Inventor: Kyu-il Jung, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 251 days.

(21) Appl. No.: 10/990,506

(22) Filed: Nov. 18, 2004

(65) Prior Publication Data
US 2005/0247864 A1    Nov. 10, 2005

(30) Foreign Application Priority Data
May 10, 2004  (KR) ............... 10-2004-0032781

(51) Int. Cl.
G02B 5/32    (2006.01)
G03H 1/04    (2006.01)

(52) U.S. Cl. ............ 250/225; 359/35; 359/1; 369/103

(58) Field of Classification Search ........ 250/225; 359/1–3, 7, 10, 11, 35; 369/103, 112.1, 112.15
See application file for complete search history.

(56) References Cited

U.S. PATENT DOCUMENTS

| | | | | |
|---|---|---|---|---|
| 5,368,193 A | * | 11/1994 | Takahashi et al. | 221/278 |
| 5,896,359 A | * | 4/1999 | Stoll | 369/103 |
| 5,966,361 A | * | 10/1999 | Stoll | 369/103 |
| 6,088,321 A | * | 7/2000 | Yamaji et al. | 369/103 |
| 6,157,473 A | * | 12/2000 | Jang et al. | 359/22 |
| 6,452,890 B1 | * | 9/2002 | Kawano et al. | 369/110.01 |
| 6,999,214 B1 | * | 2/2006 | Kang | 359/32 |
| 2004/0218241 A1 | * | 11/2004 | Roh | 359/35 |

* cited by examiner

*Primary Examiner*—Stephone B. Allen
(74) *Attorney, Agent, or Firm*—Bacon & Thomas, PLLC

(57) ABSTRACT

A mirror angle measurement and a servo control apparatus for a Holographic Digital Data Storage (HDDS) system is disclosed. The mirror angle measurement apparatus includes a first mirror having a first reflecting surface by which the reference beam is reflected toward the holographic medium, and a second reflecting surface by which a control beam is reflected to adjust the incident angle of the reference beam; a transmission unit for causing control beam to the second reflecting surface; a second mirror for returning the control beam to the second reflecting surface; and a photo detector unit for detecting the amounts of the control beam. The angle of the first mirror is adjusted based on a comparison result between the amounts of the control beam detected by the photo detector unit.

11 Claims, 4 Drawing Sheets

MIRROR ANGLE MEASUREMENT AND SERVO CONTROL APPARATUS FOR HOLOGRAPHIC DIGITAL DATA STORAGE SYSTEM

FIELD OF THE INVENTION

The present invention relates to a holographic digital data storage system; and more particularly, to a mirror angle measurement and a servo control apparatus for a holographic digital data storage system.

BACKGROUND OF THE INVENTION

Recently, technology for storing holographic digital data is being advanced in various fields with the aid of the development of a semiconductor laser, a Charge Coupled Device (CCD), a Liquid Crystal Display (LCD) and the like. For example, a fingerprint recognition system for storing and reproducing fingerprints has been put to practical use. That is, the holographic digital data storage technology is adopted to the various fields in which the high storage capacity and very high data rate are required. In the Holographic Digital Data Storage (HDDS) system for storing large amounts of data, an interference pattern, generated by allowing a signal beam to interfere with a reference beam, is recorded on a holographic medium such as a photorefractive crystal, which is sensitive to the amplitude of the interference pattern. The HDDS system can display the three dimensional (3D) image of an object by using several hundred to several thousand pieces of hologram data, which are stored on the holographic medium in the form of a binary two dimensional array (referred to as a page).

FIG. 1 is a diagram showing the configuration of a conventional HDDS system. Referring to FIG. 1, the conventional HDDS system includes a light source 10, a beam expanding lens 12, a polarization beam splitter (PBS) 14, a spatial light modulator (SLM) 16, a condenser lens 18, a first and a second mirrors 20 and 24, a delay lens 22, a holographic medium 26, an objective lens 28, and a charge coupled device (CCD) 30.

A laser beam generated by the light source 10 passes through the beam expanding lens 12, and then is divided into a reference beam and a signal beam by the PBS 14. The signal beam is inputted to the SLM 16 and then modulated into a page of binary data (bright and dark) by the SLM 16. Thereafter, the modulated signal beam is provided to the holographic medium 26 through the condenser lens 18.

Meanwhile, the first mirror 20 reflects the reference beam, which is provided by the PBS 14, toward the second mirror 24 via the delay lens 22. Thereafter, the second mirror 24 adjustably reflects the reflected reference beam toward the holographic medium 26. Herein, the angle of the second mirror 24 is adjusted by an actuator (not shown).

The interference pattern generated by the interference phenomenon between the signal beam transmitted from the SLM 16 and the reference beam reflected by the second mirror 24 is recorded on the recording layer of the holographic medium 26. In this case, the interference pattern is recorded on the recording layer of the holographic medium 26 through the light-induced generation of a mobile charge in the holographic medium 26 in response to the amplitude of the interference pattern.

Thereafter, the conventional HDDS system reproduces data recorded on the holographic medium 26 in the following manner. In order to reproduce the data recorded on the holographic medium 26, only the reference beam should be irradiated onto the holographic medium 26 while the signal beam is blocked. For this purpose, the signal beam provided from the PBS 14 may be blocked by closing a shutter (not shown) located between the PBS 14 and the SLM 16, and the reference beam provided from the PBS 14 is allowed to be incident on the first mirror 20 by opening another shutter (not shown) located between the PBS 14 and the first mirror 20. The reference beam reflected through the first and the second mirrors 20 and 24 in that order is incident on the holographic medium 26 at an incidence angle identical to that used during the recording operation. Then, the interference pattern recorded on the recording layer of the holographic medium 26 diffracts the reference beam, so that the original data, i.e., the page of binary data (check board-shaped pattern), can be reproduced. The reproduced page of binary data is provided to the CCD 30 via the objective lens 28, and then the CCD 30 takes the image of the reproduced page to convert the image into electrical data.

According to the conventional HDDS system, the angle of the second mirror 24 should be adjusted to allow the reference beam to be incident on the holographic medium 26 during playback. In the conventional HDDS system, the angle of the second mirror 24 may be adjusted to be identical to that during the recording operation. However, a unit for measuring the error in the angle of the second mirror 24 and performing the servo control for compensating the error is not included in the conventional HDDS system. Therefore, the conventional HDDS system is problematic in that it is difficult to reproduce the data accurately.

SUMMARY OF THE INVENTION

It is, therefore, an object of the present invention to provide a mirror angle measurement and a servo control apparatus for an HDDS system, capable of measuring the error in the angle of a mirror for allowing a reference beam to be incident on a holographic medium and performing servo control on the error by mounting a reflecting surface on the back surface of the mirror and by measuring the amount of a control beam by way of using the reflection phenomenon of the control beam between the reflecting surface of the back surface of the mirror and an auxiliary mirror facing the mirror.

In accordance with a preferred embodiment of the present invention, there is provided a mirror angle measurement apparatus for a Holographic Digital Data Storage (HDDS) system, the HDDS system causing a reference beam to be incident on a holographic medium to reproduce digital data recorded on the holographic medium, the mirror angle measurement apparatus including: a first mirror having a first reflecting surface on a front surface thereof by which the reference beam is reflected toward the holographic medium and a second reflecting surface on a back surface thereof by which a control beam is reflected to adjust an incident angle of the reference beam while the reference beam is incident on the holographic medium; a transmission unit for providing the control beam to the second reflecting surface; a second mirror, in case the control beam provided from the transmission unit is reflected by the second reflecting surface toward the second mirror, for returning the control beam to the second reflecting surface by reflecting the control beam; and a photo detector unit for detecting the amounts of the control beam that is reflected twice by the second reflecting surface, wherein an angle of the first mirror is adjusted based on data on the amounts of the control beam detected by the photo detector unit.

In accordance with another preferred embodiment of the present invention, there is provided a servo control apparatus for an HDDS system, the HDDS system causing a reference beam to be incident on a holographic medium to reproduce recorded digital data recorded on the holographic medium, the servo control apparatus including: a first mirror having a first reflecting surface on a front surface thereof by which the reference beam is reflected toward the holographic medium and a second reflecting surface on a back surface thereof by which a control beam is reflected to adjust an incident angle of the reference beam while the reference beam is incident on the holographic medium; a transmission unit for providing the control beam to the second reflecting surface; a second mirror, in case the control beam provided from the transmission unit is reflected by the second reflecting surface toward the second mirror, for returning the control beam to the second reflecting surface by reflecting the control beam; a photo detector unit for detecting the amounts of the control beam that is reflected twice by the second reflecting surface; an actuator for adjusting an angle of the first mirror; and a servo control part for operating the actuator based on data on the amounts of the control beam detected by the photo detector unit.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Preferred embodiments of the present invention will now be described in detail with reference to the accompanying drawings.

Figure 2:
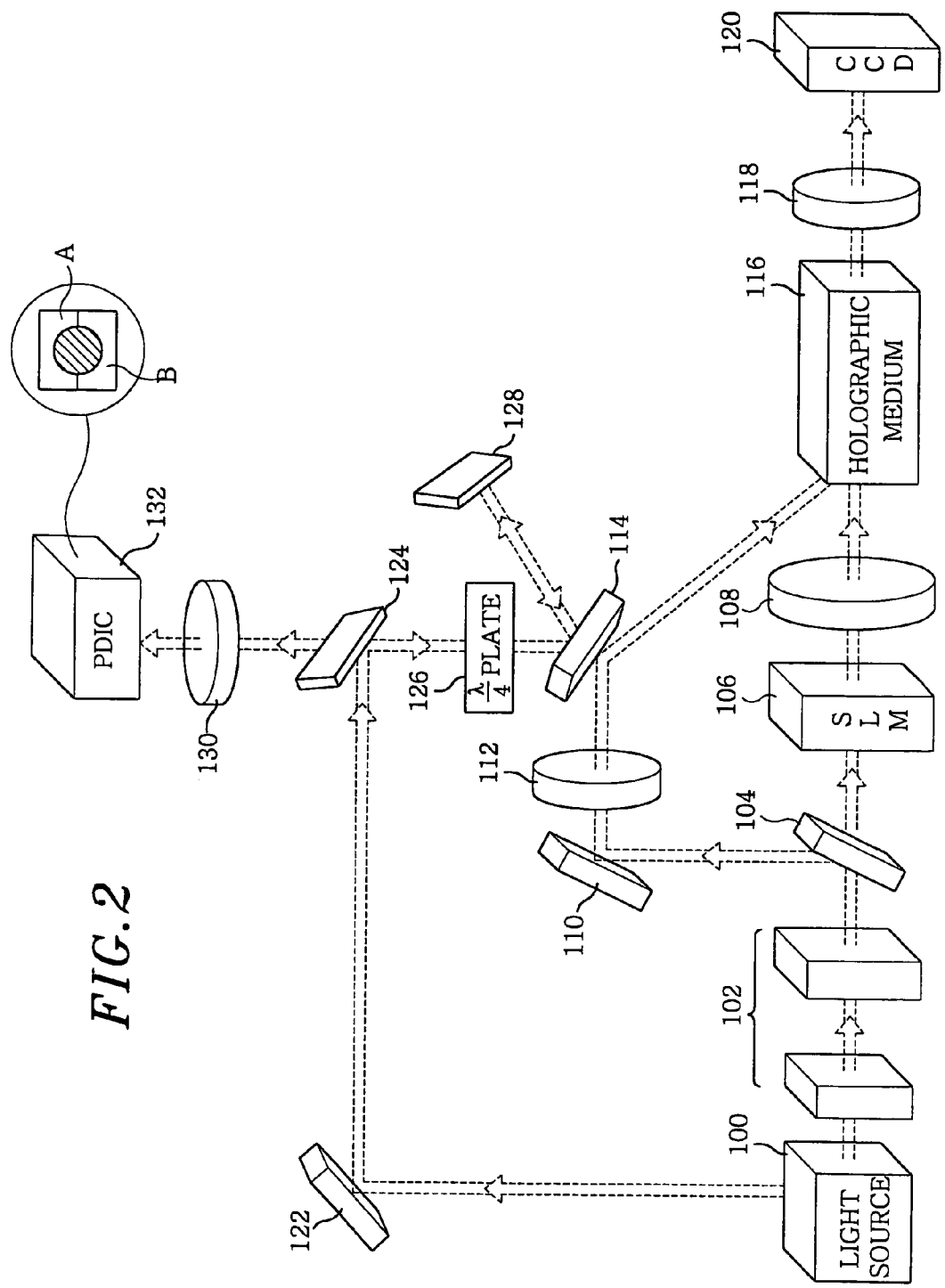
FIG. 2 is a diagram showing the configuration of a mirror angle measurement apparatus for an HDDS system in accordance with a preferred embodiment of the present invention.

FIG. 2 is a diagram showing the configuration of a mirror angle measurement apparatus which is applied to an HDDS system in accordance with a preferred embodiment of the present invention. Referring to FIG. 2, the HDDS system includes a light source 100, a beam expanding lens 102, a first PBS 104, an SLM 106, a condenser lens 108, a first and a second mirrors 110 and 114, a delay lens 112, a holographic medium 116, an objective lens 118, and a CCD 120. Moreover, the mirror angle measurement apparatus includes a third and a fourth mirrors 122 and 128, a second PBS 124, a $\lambda/4$ plate 126, a Fourier condenser lens 130, and a Photo Detector Integrated Circuit (PDIC) 132. In this case, the fourth mirror 128 is placed parallel to the second mirror 114.

Figure 1:
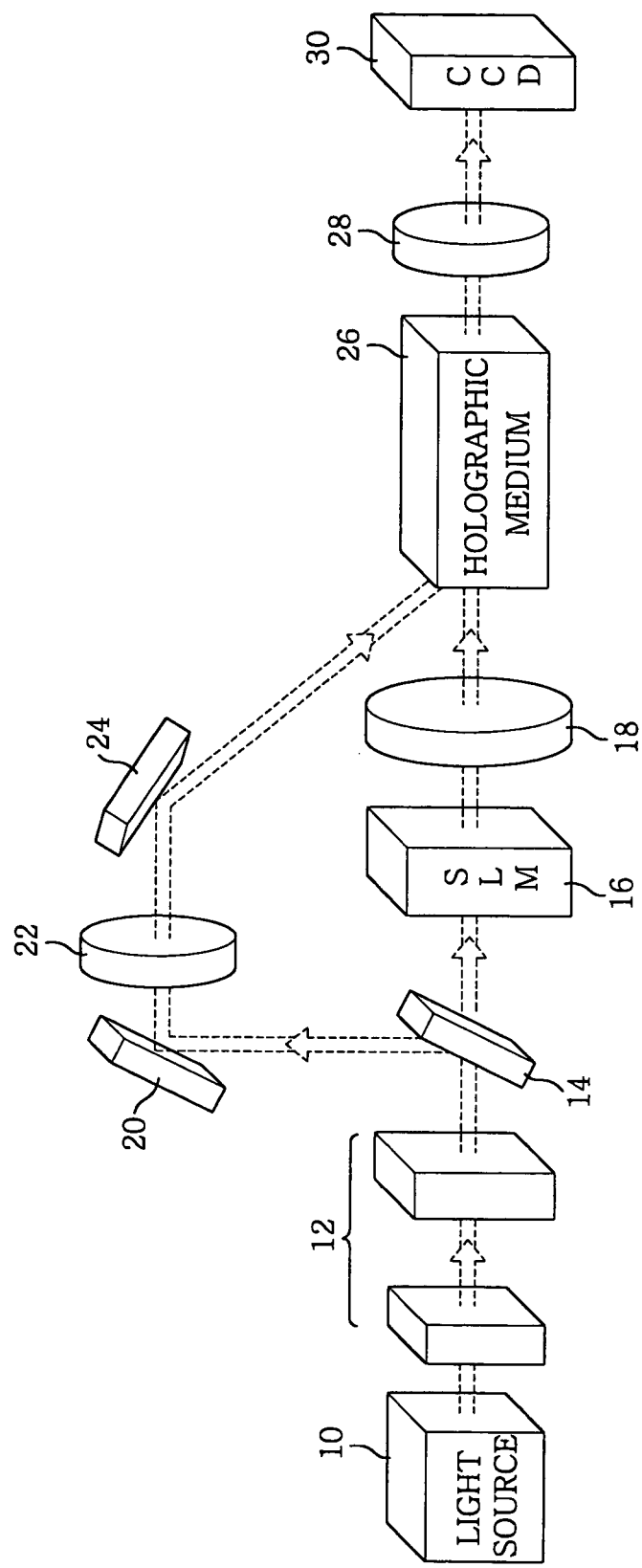
FIG. 1 is a diagram showing the configuration of a conventional HDDS system.

Since the beam expanding lens 102, the first PBS 104, the SLM 106, the condenser lens 108, the first mirror 110, the delay lens 112, the holographic medium 116, the objective lens 118 and the CCD 120 included in the HDDS system in accordance with the present invention are identical to those of the conventional HDDS system of FIG. 1, the description thereof is omitted. The second mirror 114 which can be rotated to adjust a reference beam to be incident on a proper location of the holographic medium 116 is constructed in such a way that the back surface thereof as well as the front surface thereof has a reflecting surface. By the front reflecting surface of the second mirror 114, the reference beam provided by the first mirror 110 is reflected; and by the back reflecting surface of the second mirror 114, a control beam provided by the second PBS 124, which is disposed on a control beam path for measuring the angle of the second mirror 114, is reflected toward the fourth mirror 128.

The mirror angle measurement apparatus for the HDDS system in accordance with the present invention will be described in more detail.

In the mirror angle measurement apparatus for the HDDS system in accordance with the present embodiment, the control beam with a vertical polarization generated by the light source 100 is incident on the third mirror 122 which reflects the control beam toward the second PBS 124. The second PBS 124 reflects the control beam provided from the third mirror 122 to the $\lambda/4$ plate 126 because the control beam is vertically polarized. The $\lambda/4$ plate 126 converts the vertically polarized control beam into a circularly polarized control beam by delaying the vertically polarized control beam by $\lambda/4$, and then provides the circularly polarized control beam to the back reflecting surface of the second mirror 114. Thereafter, the circularly polarized control beam is reflected by the back reflecting surface of the second mirror 114 toward the fourth mirror 128, while the front reflecting surface of the second mirror 114 is used to reflect the reference beam toward the holographic medium 116 thereby recording data on the holographic medium 116.

The fourth mirror 128 is disposed to be perpendicular to the circularly polarized control beam incident thereon in case the data recorded on the holographic medium 116 is reproduced by placing the second mirror 114 at an angle identical to that during the recording operation. Therefore, in case the angle of the second mirror 114 during playback is identical to that during the recording operation, the circularly polarized control beam incident on the fourth mirror 128 provided from the second mirror 114 is so reflected by the fourth mirror 128 as to return through the same beam path to the second mirror 114. The circularly polarized control beam is reflected by the back reflecting surface of the second mirror 114 and then transmitted to the $\lambda/4$ plate 126, which converts the circularly polarized control beam into a horizontally polarized control beam by $\lambda/4$ delay. Since the second PBS 124 has the characteristic of passing the horizontally polarized control beam therethrough, the second PBS 124 transmits the horizontally polarized control beam to the PDIC 132 via the condenser lens 130. The PDIC 132 detects the horizontally polarized control beam transmitted through the second PBS 124 by using segmented sensor regions A and B. If the amounts of the horizontally polarized control beam detected by the two segmented sensor regions are identical each other, a servo control part (not shown in FIG. 2) determines the current angle of the second mirror 114 to be correct, i.e., stops the adjustment of the angle of the second mirror 114. In contrast, if the amounts of the horizontally polarized control beam detected by the two sensor regions A and B are not identical each other, the error in the angle of the second mirror 114 is measured to adjust it by the servo control part.

Figure 3:
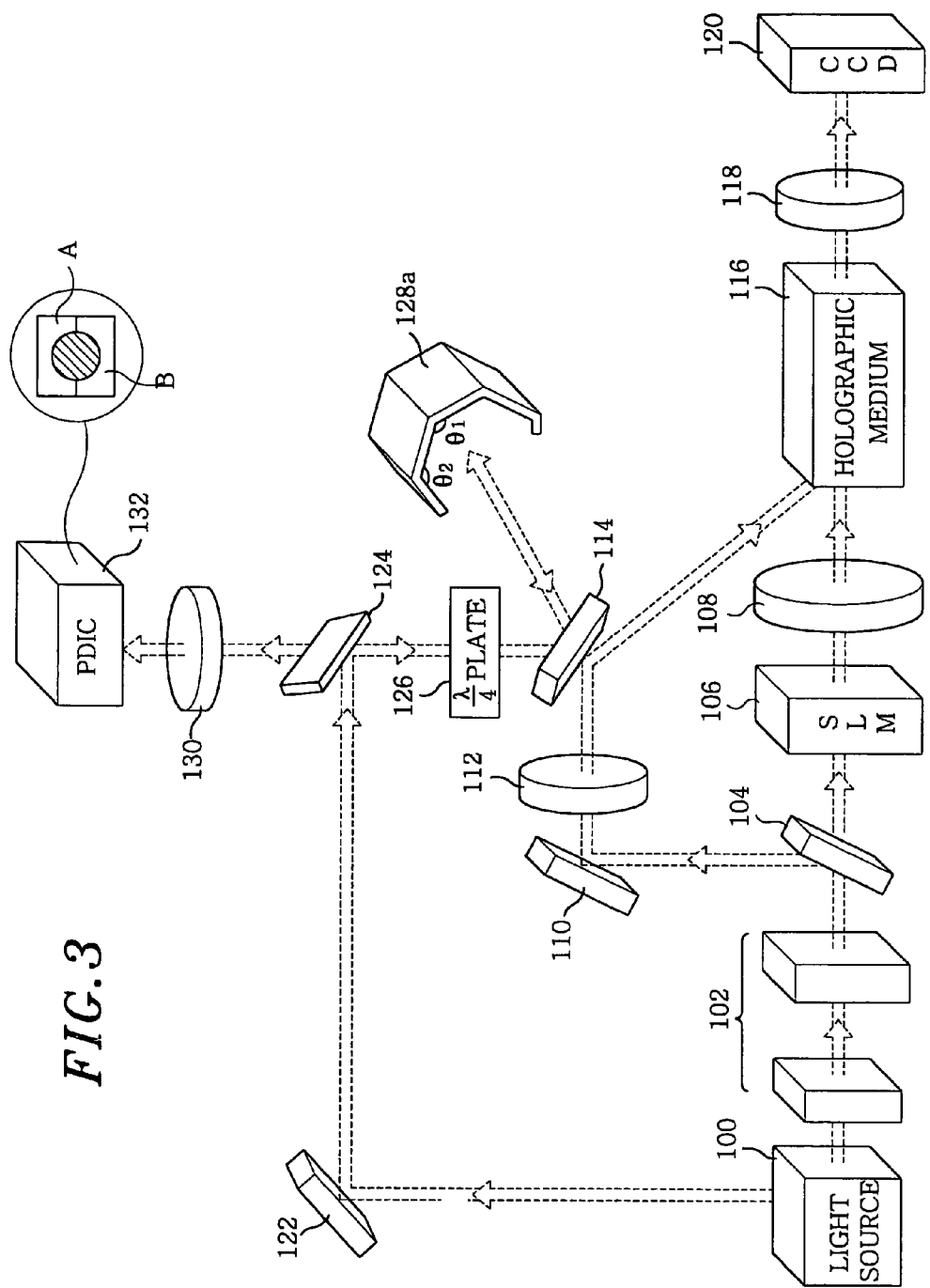
FIG. 3 is a diagram showing the configuration of a mirror angle measurement apparatus for the HDDS system in accordance with another preferred embodiment of the present invention.

FIG. 3 is a diagram showing the configuration of a mirror angle measurement apparatus for the HDDS system in accordance with another preferred embodiment of the present invention. Referring to FIG. 3, the fourth mirror 128 of FIG. 2 is modified into a multi-mirror 128a having a plurality of reflecting surfaces. For example, when the inside angles between the reflecting surfaces of the multi-mirror 128a are $\theta_1$ and $\theta_2$ ($\theta_1=\theta_2$ or $\theta_1\neq\theta_2$), the circularly polarized control beam provided from the second mirror 114 can be reflected at different angles by the reflecting surfaces of the multi-mirror 128a. Accordingly, the position of the multi-mirror 128a may be adjusted in response to the angle of the second mirror 114, until the circularly polarized control beam reflected by the back reflecting surface of the second mirror 114 toward the multi-mirror 128a is perpendicular to the reflecting surface of the multi-mirror 128a. Thereafter, the amounts of the horizontally polarized control beam transmitted through the second PBS 124 are detected by the two segmented sensor regions in the PDIC 132 to determine whether the angle of the second mirror 114 during playback is identical to that during the recording operation.

Figure 4:
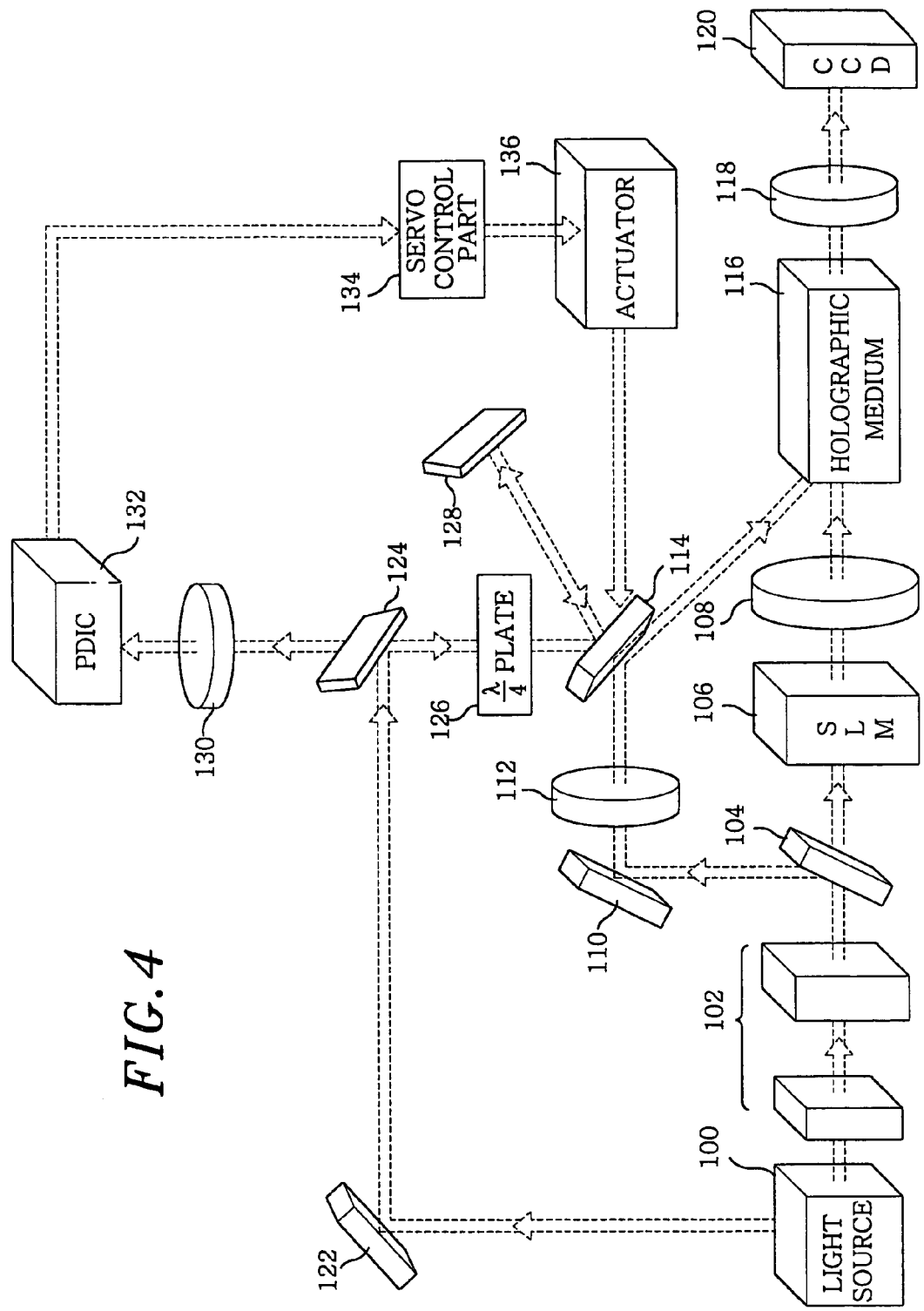
FIG. 4 is a diagram showing the configuration of a mirror angle servo control apparatus for the HDDS system in accordance with still another preferred embodiment of the present invention.

FIG. 4 is a diagram showing the configuration of a servo control apparatus for the HDDS system in accordance with a still another preferred embodiment of the present invention. Referring to FIG. 4, the mirror angle servo control apparatus, including a servo control part 134 and an actuator 136, is added to the mirror angle measurement apparatus for the HDDS system of FIG. 2.

In the servo control apparatus, the two pieces of data on the amounts of the horizontally polarized control beam detected by the segmented sensor regions A and B of the PDIC 132 are transmitted to the servo control part 134. The servo control part 134 compares the amounts of the horizontally polarized control beam with each other, and then performs servo control on the actuator 136 for adjusting the angle of the second mirror 114 in response to a comparison result. That is, if the amounts of the horizontally polarized control beam detected by the two segmented sensor regions of the PDIC 132 are identical each other, the servo control part 134 determines that the angle of the second mirror 114 has been correctly adjusted so that the actuator 136 is not operated. In contrast, if the amounts of the horizontally polarized control beam detected by the two segmented sensor regions of the PDIC 132 are not identical each other, the servo control part 134 determines that the angle of the second mirror 114 has not been correctly adjusted so that the actuator 136 is operated to adjust the angle of the second mirror 114.

Thereafter, to confirm whether or not the angle of the second mirror 114 has been correctly adjusted, the control beam generated by the light source 100 is again incident on the back reflecting surface of the second mirror 114 via the third mirror 122, the second PBS 124, and λ/4 plate 126 in that order, and then reflected toward the fourth mirror 128 by the second mirror 114, and then reflected to the back reflecting surface of the second mirror 114 by the fourth mirror 128, and then transmitted from the back reflecting surface of the second mirror 114 to the PDIC 132 via the λ/4 plate 126, the second PBS 124 and the condenser lens 132 in that order. The two pieces of data on the amounts of the horizontally polarized control beam detected by the PDIC 132 are transmitted to the servo control part 134, and then the servo control part 134 compares the amounts of the horizontally polarized control beam with each other, thereby controlling the operation of the actuator 136. That is to say, the servo control part 134 adjusts the angle of the second mirror 114 by operating the actuator 136 until the two pieces of data on the amounts of the horizontally polarized control beam become identical each other, thereby allowing the reference beam to be incident on the proper location of the holographic medium 116.

As described above, in accordance with the present invention, the back reflecting surface is disposed on the back surface of the second mirror 114, the front reflection surface of the second mirror 114 being used to allow the reference beam to be incident on the holographic medium 116. Moreover, the mirror angle measurement apparatus detects the amounts of the control beam that has experienced the reflection phenomenon between the back reflecting surface of the second mirror 114 and the fourth mirror 128 facing the second mirror 114, thereby measuring the error in the angle of the second mirror 114.

Furthermore, the present invention is provided with the servo control apparatus for controlling the operation of the actuator 136 to adjust the angle of the second mirror 114.

While the invention has been shown and described with respect to the preferred embodiments, it will be understood by those skilled in the art that various changes and modifications may be made without departing from the spirit and scope of the invention as defined in the following claims.

What is claimed is:

1. A mirror angle measurement apparatus for a Holographic Digital Data Storage (HDDS) system, the HDDS system causing a reference beam to be incident on a holographic medium to reproduce digital data recorded on the holographic medium, the mirror angle measurement apparatus comprising:
a first mirror having a first reflecting surface on a front surface thereof by which the reference beam is reflected toward the holographic medium and a second reflecting surface on a back surface thereof by which a control beam is reflected to adjust an incident angle of the reference beam while the reference beam is incident on the holographic medium;
a transmission unit for providing the control beam to the second reflecting surface;
a second mirror, in case the control beam provided from the transmission unit is reflected by the second reflecting surface toward the second mirror, for returning the control beam to the second reflecting surface by reflecting the control beam; and
a photo detector unit for detecting the amounts of the control beam that is reflected twice by the second reflecting surface,
wherein an angle of the first mirror is adjusted based on data on the amounts of the control beam detected by the photo detector unit.

2. The mirror angle measurement apparatus of claim 1, wherein the transmission unit is a PBS.

3. The mirror angle measurement apparatus of claim 2, further comprising a λ/4 plate between the PBS and the first mirror.

4. The mirror angle measurement apparatus of claim 1, wherein the second mirror is a multi-mirror having a plurality of reflecting surfaces.

5. The mirror angle measurement apparatus of claim 1, wherein the photo detector unit is a sensor having at least two segmented sensor regions.

6. A servo control apparatus for an HDDS system, the HDDS system causing a reference beam to be incident on a holographic medium to reproduce recorded digital data recorded on the holographic medium, the servo control apparatus comprising:
a first mirror having a first reflecting surface on a front surface thereof by which the reference beam is reflected toward the holographic medium and a second reflecting surface on a back surface thereof by which a control beam is reflected to adjust an incident angle of the reference beam while the reference beam is incident on the holographic medium;

a transmission unit for providing the control beam to the second reflecting surface;

a second mirror, in case the control beam provided from the transmission unit is reflected by the second reflecting surface toward the second mirror, for returning the control beam to the second reflecting surface by reflecting the control beam;

a photo detector unit for detecting the amounts of the control beam that is reflected twice by the second reflecting surface;

an actuator for adjusting an angle of the first mirror; and a servo control part for operating the actuator based on data on the amounts of the control beam detected by the photo detector unit.

7. The servo control apparatus of claim 6, wherein the transmission unit is a PBS.

8. The servo control apparatus of claim 7, further comprising a $\lambda/4$ plate between the PBS and the first mirror.

9. The servo control apparatus of claim 6, wherein the second mirror is a multi-mirror having a plurality of reflecting surfaces.

10. The servo control apparatus of claim 6, wherein the photo detector unit is a sensor having at least two segmented sensor regions.

11. The servo control apparatus of claim 10, wherein the servo control part operates the actuator if it is determined that an angle of the first mirror during playback is not identical to that during the recording operation, the determination thereof being based on a comparison result between the amounts of the control beam detected by the two segmented sensor regions.

* * * * *